July 1, 1947.  A. B. BOLENDER  2,423,367
INDEXING UNIVERSAL GRINDING MACHINE
Filed Nov. 24, 1944   5 Sheets-Sheet 1
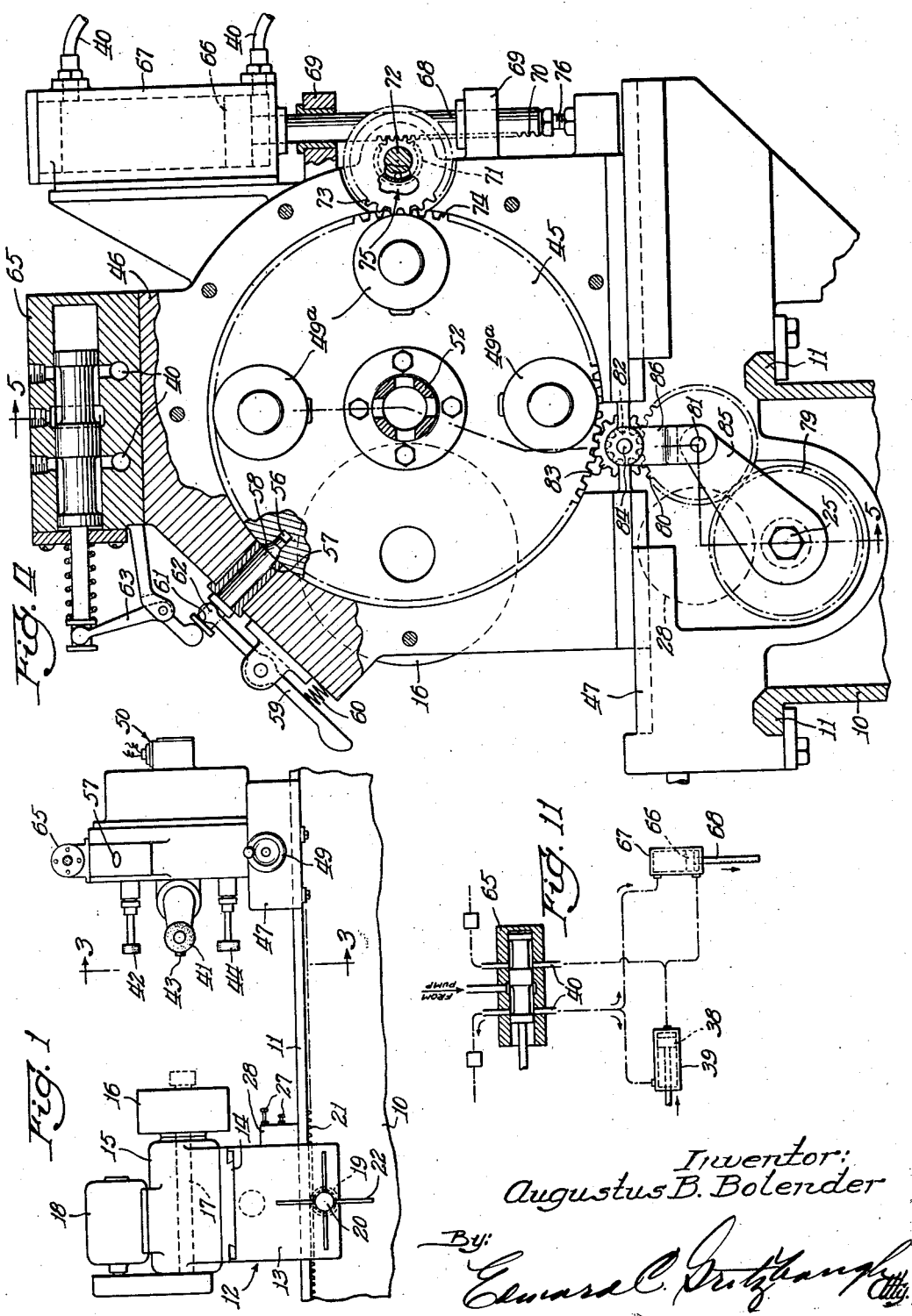
Inventor:
Augustus B. Bolender July 1, 1947.  A. B. BOLENDER  2,423,367
INDEXING UNIVERSAL GRINDING MACHINE
Filed Nov. 24, 1944  5 Sheets-Sheet 2
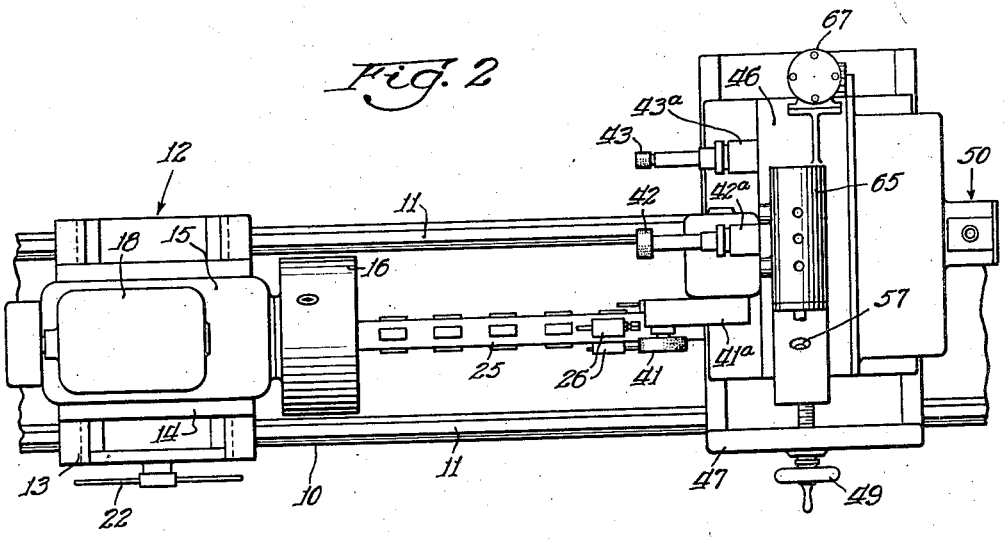
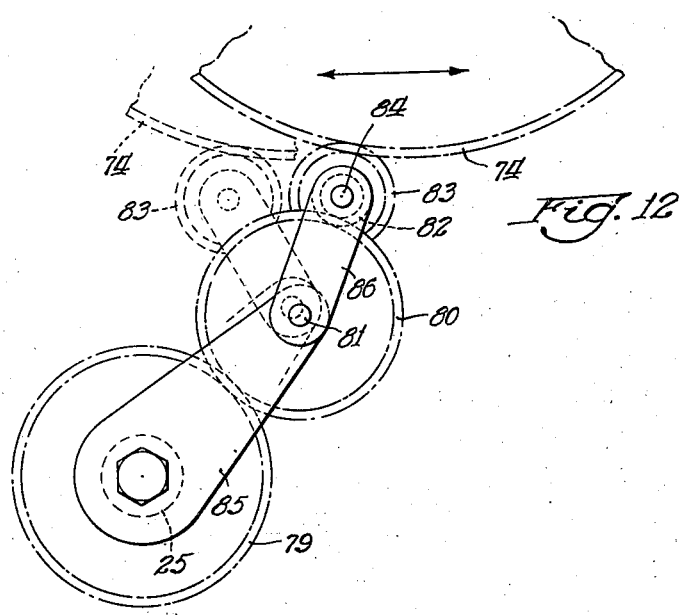
Inventor
Augustus B. Bolender
By:
Edward C. Fitzhugh Atty.

July 1, 1947.　　　　A. B. BOLENDER　　　　2,423,367
INDEXING UNIVERSAL GRINDING MACHINE
Filed Nov. 24, 1944　　　　5 Sheets-Sheet 3
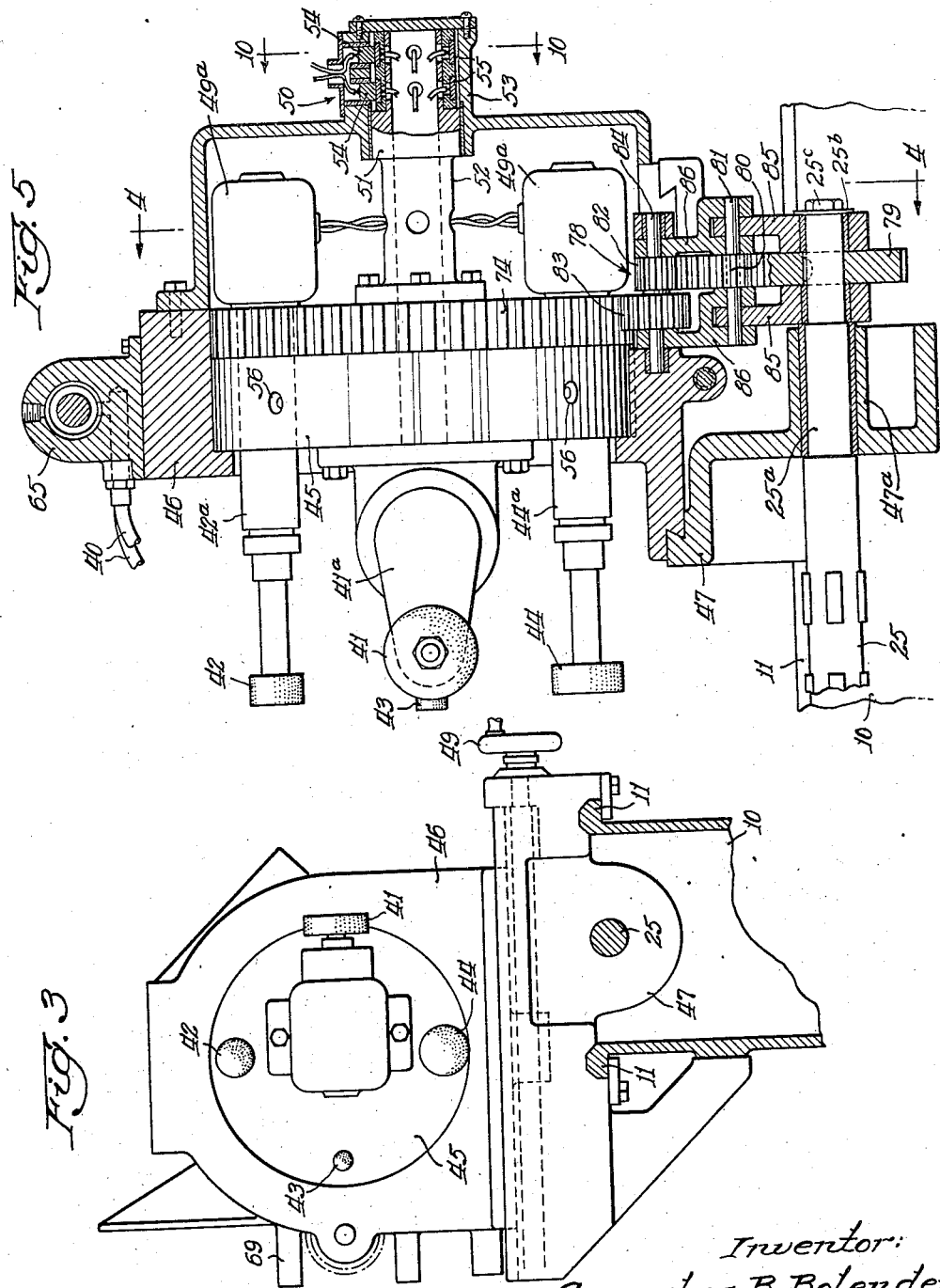

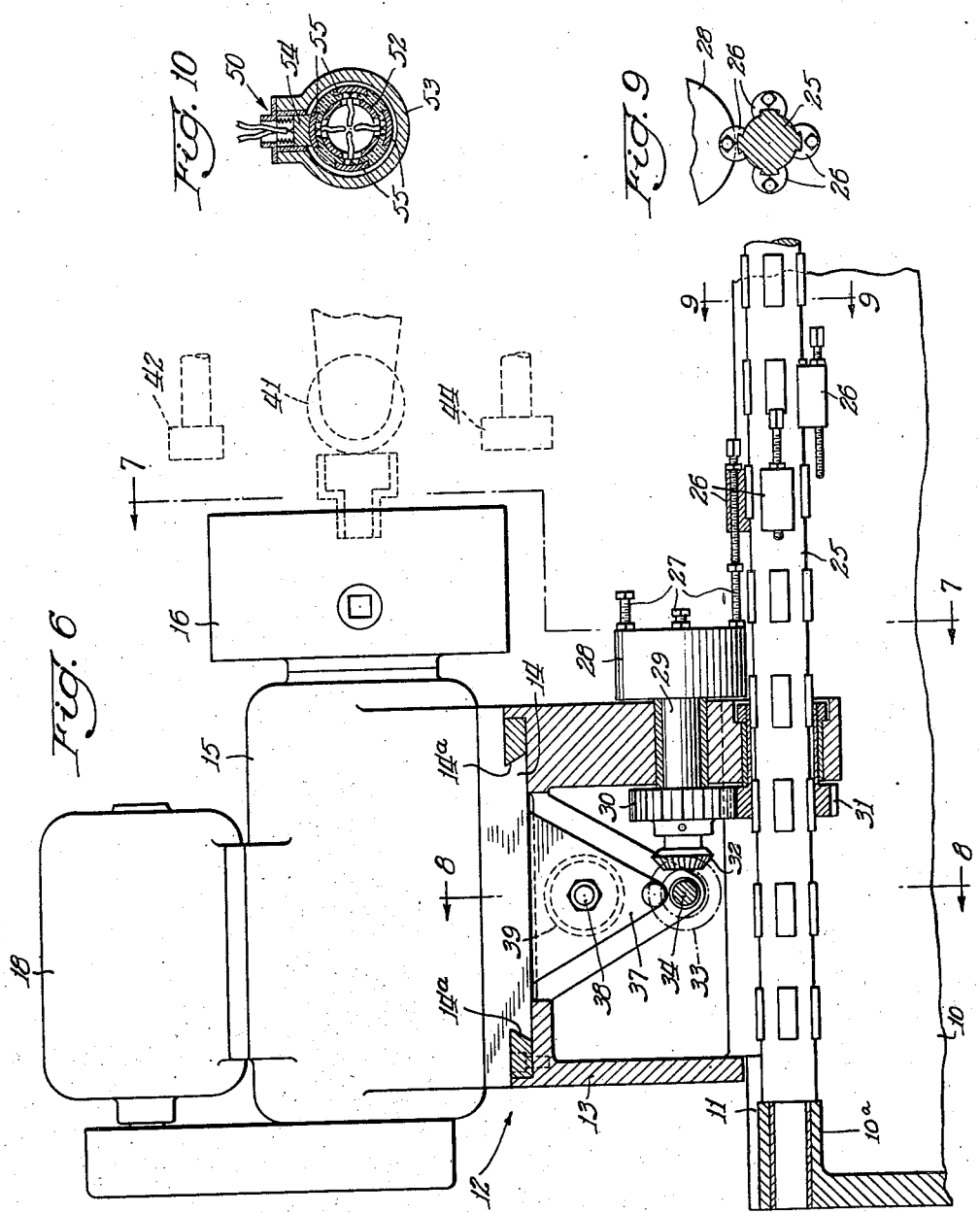

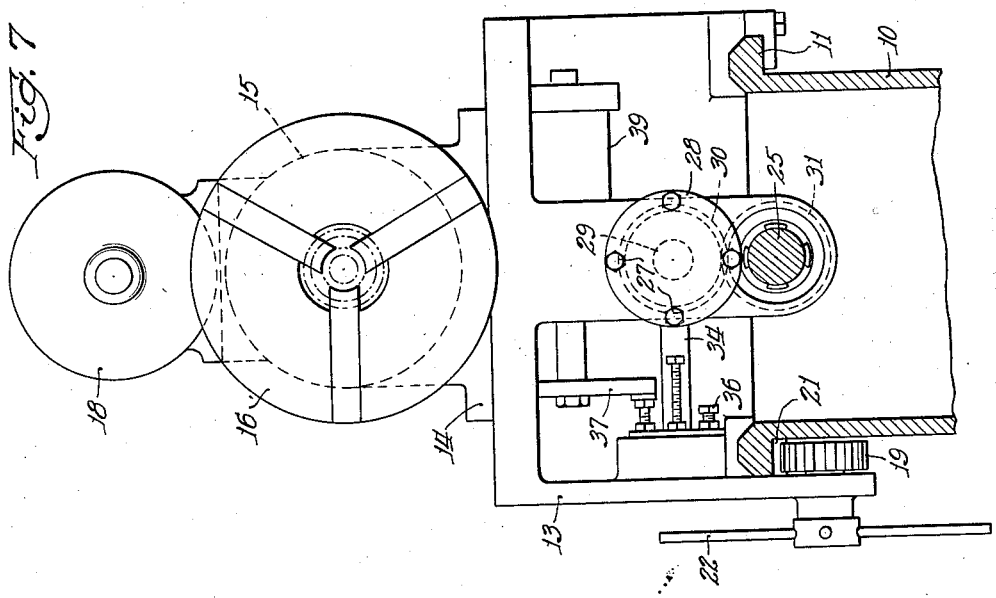

Patented July 1, 1947

2,423,367

UNITED STATES PATENT OFFICE 2,423,367

INDEXING UNIVERSAL GRINDING MACHINE

Augustus B. Bolender, Muncie, Ind., assignor to Borg-Warner Corporation, Chicago, Ill., a corporation of Illinois Application November 24, 1944, Serial No. 564,969

17 Claims. (Cl. 51—105)

The present invention relates to grinding machines, and has particular reference to a machine wherein provision is made for automatically performing a plurality of grinding operations upon the surface or surfaces of a work piece by means of a series of tools that are successively engaged with different portions of the work.

It is one of the principal objects of this invention to simplify the construction of an indexing grinding machine such as contemplated herein, and to improve the efficiency, operation, and dependability of such machine.

Also one of the principal objects of this invention is to provide a grinding machine that is effective to accomplish a greater range of work as compared with prior grinders, and to do this work quickly and with extreme accuracy. In this connection the present grinding machine has provision for performing a plurality of operations upon the same piece of work without removing the work from the head stock and without changing the tools. These operations are performed in sequence by an indexed tool head that is adapted to move to automatically shift the tools one after the other successively into its predetermined operative position with relation to the work.

Another object hereof resides in providing a grinding machine wherein the change-over from one grinding operation to the next succeeding operation is accomplished in a rapid manner and is done automatically after an indexing control lever is manipulated when each grinding operation is completed.

A further object of this invention is to provide a grinding machine that will operate in an effective manner to produce surfaces on a piece of work that are truly parallel or concentric to each other especially where extreme accuracy and alignment is demanded and where the tolerances are a small fractional part of an inch, such as the requirements for aircraft parts and appliances. In producing an article with the machine contemplated herein there are no variations of centers in grinding the exterior and interior concentric surfaces of a tubular piece of work.

A still further object hereof resides in providing a grinding machine wherein, after the tools have been set up for a particular job of work, the apparatus will perform a plurality of separate and distinct operations on the work without removing or replacing the grinding tools or removing the work piece. The tools in the present machine are mounted so that they may be automatically indexed to perform at least four successive operations before the work is removed from the headstock. This avoids the necessity of removal and transfer of the work to a second, third and fourth machine to perform the different operations that are all performed on the present machine. It also obviates the necessity of removal and change of tools in the tool head which is liable to upset axial alignment when grinding the inner and outer surfaces of a tubular piece.

Another of the objects of this invention resides in providing a grinding machine that employs a plurality of grinding tools and spindles, each of which is operated by its individual motor and the desired motor is automatically cut-in during the step of indexing the turret upon which the spindles are mounted. During the indexing of the tools the work preferably remains stationary at a position remote of the tools, and after each tool has been properly indexed the work will be rotated and a relative movement between the work and the tools will be automatically effected to grind a surface.

Another important feature of the present invention is that the instrumentalities of this indexing grinding machine are adapted to be readily incorporated, in most of its aspects, on a standard apparatus such as a saddle type turret lathe.

Other objects, aims and advantages of the improvements that are contemplated herein will be apparent to persons skilled in the art after the construction and operation of the indexing grinding machine is understood from the within description.

It is preferred to accomplish the numerous objects of this invention and to practice the same in substantially the manner hereinafter fully described and as more particularly pointed out in the appended claims. Reference is now made to the accompanying drawings that form a part of this specification wherein:

Fig. 1 is a longitudinal side elevation of a grinding machine showing the instrumentalities of the present invention incorporated thereon;

Fig. 2 is a top plan of the machine shown in Fig. 1;

Fig. 3 is a transverse vertical section, taken on the plane of line 3—3 on Fig. 1, looking in the direction of the arrows or toward the turret tool head of the machine;

Fig. 4 is a vertical end elevation of the grinding machine looking toward the outer end of the turret assembly on the plane of line 4—4, Fig. 5 with the cover removed;

Fig. 5 is a vertical axial section through the turret or tailstock assembly of the grinder, taken along the planes of line 5—5 on Fig. 4 looking in the direction of the arrows;

Fig. 6 is a side elevation of the headstock assembly, the lower portion being in section along the plane of line 6—6 on Fig. 8;

Fig. 7 is a front elevation of the assembly shown in Fig. 6, the view being along the plane of line 7—7 on Fig. 6;

Fig. 8 is a fragmentary vertical section along the plane of line 8—8 on Fig. 6 looking in the direction of the arrows;

Fig. 9 is a transverse section through the indexing bar and stop devices for the headstock assembly, the section taken along the plane of line 9—9 on Fig. 6;

Fig. 10 is a vertical section of the control switch for the tool motors on the turret, the view taken along the plane of line 10—10 on Fig. 5.

Fig. 11 is a diagrammatic view, partly in section, of the hydraulic system;

Fig. 12 is an enlarged fragmental view of the transmission gear train assembly for operatively connecting the index-bar and turret, showing two positions thereof.

The drawings are to be understood as being more or less of a schematic character for the purpose of disclosing typical or preferred forms of the improvements that are contemplated herein, and in these drawings like reference characters identify the same parts throughout the several views.

As before stated, the present improvements are adapted for assembly on a standard turret lathe of the saddle type, and a structure of this character is shown in Figs. 1 and 2, but it will be appreciated that the instrumentalities of this indexing grinding machine are adapted for assembly with other types of standard apparatus that are convenient for this purpose.

The structure that is shown in Figs. 1 and 2 comprises the elongated table 10, such as employed for saddle type turret lathes, that is provided with longitudinal ways 11 for supporting and guiding the headstock 12 to bodily reciprocate as desired in directions longitudinally of the table. These ways 11 extend parallel with each other to the opposite end of the table where the indexing grinding turret assembly is mounted on said ways in any suitable manner which prevents its longitudinal movement toward and from the headstock. This headstock comprises the base or saddle 13 that straddles the table; the cross-slide 14 movable in dovetail ways 14a on the saddle for adjustment transverse to the longitudinal reciprocal movement of the headstock; and a work head 15 for the chuck 16 that has its spindle 17 journaled therein for rotative movement. A power source, such as a motor 18, is conveniently mounted on the top of the work head and has operative connection, preferably by a belt and pulleys (not shown) with the chuck spindle 17 for driving the latter at the required speed.

The movement of the headstock longitudinally on the table is effected by means of a pinion 19 that has its rotatable spindle 20 journaled in the saddle 13, which pinion is meshed with an elongated rack 21 extending along a convenient portion of the table 10. Spindle 20 is rotated preferably by manually operating a handwheel 22 that has its hub anchored to an extended end portion of said spindle so that the turning of said handwheel in one direction will bodily move the headstock 12 toward the grinding members that are positioned at the opposite end of the table, and the turning of said handwheel in a reverse direction will retract the headstock to move it bodily away from the grinding members.

The movement of the headstock in a direction toward the grinding members is arrested at different locations along the table for the purpose of predetermining the lineal dimensions of the surfaces that are operated on by the grinders. This is readily accomplished by means of an elongated index-bar 25 that extends longitudinally on the table and is provided with stops 26 that are adjustable longitudinally thereon. Index bar 25 passes beyond headstock 12 to the end of the table where its smooth end portion is rotatably journaled in a suitable bearing 10a. The stops 26 are adapted to be engaged (Figs. 6 and 7) by other stops 27 that project different distances from a block 28 that is secured to the extended end of a rotatable spindle 29 having bearings in the base or saddle 13 of the headstock. Intermediate its ends the spindle 29 has a gear 30 secured to it that is meshed with a gear 31 on the adjacent portion of the index-bar 25, and at its inner end portion this spindle 29 is provided with a bevel-pinion 32 that is meshed with a bevel-pinion 33 on the adjacent end of a short spindle 34 having its axis disposed transverse to the axis of the spindle 29. At its end opposite bevel-pinion 33, the spindle 34 has an indexing head 35 secured to it that is provided with a plurality of adjustable stops 36 to control transverse travel of the cross-slide 14 that supports the chuck 16 of the headstock assembly. Thus, when the stops 27 are indexed to limit longitudinal movement of the headstock toward the grinding members on the tailstock, the stops 36 are also indexed to control cross travel of the chuck 16 to properly position the work piece so that the selected grinder will engage the surface on which a grinding operation is to be performed.

Although two sets of four stops each have been shown in the present disclosure, it will be obvious that a different number may be employed, depending upon the work to be performed in several stages by the grinders. A stop 36 that has been selectively positioned will be aligned with a lug 37 depending from the cross slide. The outer end of a piston 38 is attached to the lug 37, and when the cross-slide 14 is moved transversely of the table by the piston 38, such movement is arrested at the desired position by engagement of the lug 37 with the selected stop 36. The operation of the piston 38 is effected by a pressure fluid that is contained in a closed circuit comprising flexible tubular cables 40 that is supplied from a suitable source in the manner later explained herein.

The members for operating upon the work comprise a plurality of rotatable grinders 41, 42, 43 and 44 (Figs. 1, 3 and 5) that are of various shapes for performing internal and external operations upon different surfaces of the work piece, and they are arranged for bodily movement around a common center when their support is indexed for the purpose of bringing them successively into position to be engaged with the surfaces whereon they are to perform their respective tasks. The respective spindles of these grinding members are secured in a plurality of rotatable holders 41a, 42a, 43a and 44a (Fig. 5) that are journaled on a turret 45 adapted to be rotatably indexed upon a horizontal axis disposed parallel to the rotational axis of the work chuck 16 which the turret confronts. In the type of apparatus shown in Fig. 3 the holder 41a for grinder 41 is positioned with its axis transverse to the axes of the other holders.

The turret 45, which has a cylindrical or drum-shape, is rotatably mounted in a support 46 that is dovetailed for sliding movement transverse of the table 10 on a bed 47 that is secured against longitudinal movement on the table in any usual or well-known manner (not shown). The transverse movement of the turret is for the purpose of adjusting the turret 45 and its instrumentalities to the predetermined position where the grinding members are in positions to perform their successive grinding operations upon the work piece whenever they are respectively engaged with the surface to be worked on. This transverse adjustment of the turret is accomplished by turning a handwheel 49 that effects a micrometer movement of the turret through the instrumentalities of the usual reduction gear train (not shown) that operatively connects said handwheel and turret in the well-known manner, and after this adjustment has been made the grinding members are ready to successively operate on the different surfaces of the work after each intermittent indexing of the turret.

The rotatable holders for the grinding members are individually driven by separate motors 49a that are mounted upon the indexing turret 45, and they are individually thrown into operation by an electric control switch 50 of the selective rotary type that is adapted to close the electric circuit through the proper motor when the turret has been indexed and the selected grinding member has been positioned for operating upon a particular surface of the work piece. The control switch comprises an enlargement 51 on the outer end of a shaft 52 projecting axially from the turret. The enlargement is enclosed in a cylindrical hollow housing 53 in the wall of which there is imbedded the fixed main contacts 54, and annular recesses or seats are made in the surface of the enlargement to receive the contacts 55 that are electrically connected to the respective motors. By reason of this assembly, one motor will be in circuit during operation upon a particular surface of the work piece and the remaining motors will be out of circuit and idle.

For the purpose of indexing the turret 45 it is provided with a plurality of sockets 56, preferably four in number corresponding to the number of grinding members on the turret, and the wall of the turret support 46 is provided with a bore 57 to receive and guide a reciprocal plunger 58 the inner end of which is normally seated in one of the sockets 56. The other end of the plunger 58 projects out of the bore 57 where it is engaged by the adjacent end of the indexing control lever 59 that is fulcrumed intermediate its ends on the exterior of the support 46 and is urged by a spring 60 in a direction to yieldably seat the plunger 58 in a socket 56. The outer end of said plunger 58 is provided with an annular groove 61 that is engaged by a fork 62 on the end of the control lever 59.

When the control lever is operated to retract the plunger 58 from a recess 56 such movement of these elements is adapted to actuate a bell-crank lever 63 of a two-way valve 65 for controlling the flow of pressure fluid in the tubular cables 40 hereinbefore mentioned, thereby rendering the piston 38 in headstock cylinder 39 active to bodily shift the headstock 12 transversely of the bed, or to the right in Fig. 8. This shifting of the headstock will retract abutment 37 from the stops 36 so that stop drum 35 is free to be rotated through the instrumentality of the common index bar 25, without interference with the abutment, and the next stop may be then brought into position. When latch plunger 58 enters its next recess 56, the valve 65 will be reversed so that the piston 38 moving in its other direction, effects a return movement of the headstock, to the left in Fig. 8, until abutment 37 engages the selected stop 36 and thus index the headstock assembly. At the same time the pressure fluid activates a piston 66 that is reciprocal in a cylinder 67 mounted on the side of the support 46 opposite the control lever or handle 59. The rod 68 of piston 66 is elongated and slides in guides 69 below the cylinder 66 and it is provided with a row of rack teeth 70 that are meshed with a pinion 71 carried upon a short shaft 72 journaled on the support 46. Shaft 72 is provided with a gear 73 that meshes with an annular rack or circumferential row of teeth 74 on the adjacent portion of the turret. An overriding clutch or free-wheeling device 75 is interposed between gear 73 and its shaft 72 to permit said gear 73 to be rotated in one direction only. Thus, when the piston rod 68 is moved outward from the cylinder 67 the gear 73 will be rotated a distance sufficient to turn the turret until the next succeeding socket 56 therein is engaged by the plunger 58, and during the retraction of the piston rod 68 said gear 73 will remain idle. An adjustable positioning stop 76 arrests the outward movement of the piston rod 68.

The main indexing shaft 25, that is rotatably mounted on the table 10, extends longitudinally thereof, and one end passes through the saddle or base 13 of the head stock. Within the saddle this indexing shaft 25 is provided with the gear 31 that is meshed with gear 30 on the spindle 29 of the head carrying the stops 27. The opposite reduced end portion 25a of the indexing shaft 25 enters the bed 47 of the tailstock or turret support 46 where it is journaled in a bearing boss 47a and beyond which it has geared connection with the rack or toothed region 74 of the rotatable turret. The instrumentalities for effecting this geared connection comprises a transmission gear train assembly 78. The index rod or shaft 25 has a gear 79 keyed to it that meshes with an idler gear 80 that is carried upon the fulcrum pin 81 at the knee of a toggle device. A gear cluster, comprising a pinion 82 and gear 83 are rotatably carried on a stud 84 projecting horizontally from the lower portion of the side of the turret support 46 adjacent the bed 47. Gear 83 meshes with the annular rack or circumferential teeth 74 on the adjacent edge portion of the turret 45 which is thus rotated by the indexing-bar 25 when the latter is turned. The toggle device comprises a pair of links 85 loosely carried by the end portion of index-bar 25 and the fulcrum pin 81 with gear 79 between said links. A washer 25b on the end of index bar 25, overlying the fulcrum region of adjacent link 85, is held in place by nut 25c. During operation of the machine, this arrangement permits rotation of the index bar and prevents relative longitudinal movement between the tailstock assembly and said index bar. The other member of the toggle device comprises a pair of links 86 loosely carried by the stud 84 and the fulcrum pin 81 with the idler gear 80 and the cluster gears between them. This gear train arrangement is shown in detail in Figs. 3, 5 and 12, wherein it will be apparent that the train will be maintained in meshed relation regardless of the position to which the turret 45 and its support 46 may be adjustably shifted transverse to the table. This is due to the fact that during the shifting of the turret the toggle knee pin 81 will assume different positions and the links 85 and 86 will swing on their outer fulcrums respectively at the bar 25 and the stud 84 as illustrated in the dotted line position on Fig. 12. When the turret is indexed to place a grinding member in position to engage a surface of the work piece, the indexing shaft will be rotated and such rotation will turn the head 28 until the proper stop 27 has been positioned to limit the movement of the headstock and work piece in a direction toward the turret.

It is apparent from the foregoing that the work performed by the present apparatus is done quickly and with extreme accuracy, furthermore, a plurality of operations are performed upon a work piece without removing it from the headstock chuck or interchanging the tools.

The successive operations on the work piece are accomplished by tools carried on a turret that is automatically indexed to properly position these tools for successive operation on different surfaces of the work piece during relative longitudinal movement between the headstock and turret on the table. By reason of the construction and arrangement of the components in this assembly it is possible to grind surfaces that are exactly parallel or concentric with respect to each other, or are at true right angles.

While this invention has been described in detail in its present preferred form or embodiment, it will be apparent to those skilled in the art, after understanding the invention, that various changes and modifications may be made therein without departing from the spirit or scope thereof. It is aimed in the appended claims to cover all such changes and modifications.

I claim:

1. An indexing grinding machine comprising a table; a rotatable headstock on said table; indexing devices for selectively positioning said headstock at stations transversely of said table; a rotatable turret opposing said headstock; means effecting adjustment of said turret transversely on said table; a plurality of rotatable grinding members projecting from said turret adapted to be selectively aligned with the surfaces of the work; indexing means for rotating said turret to selectively position said grinding members with respect to the work surfaces; means for effecting reciprocatory relative movement between said headstock and turret for engaging a grinding member with a work surface; and means responsive to the indexing movement of said turret for operating said headstock indexing devices.

2. An indexing grinding machine comprising a table; a rotatable headstock adapted to be shifted to predetermined stations transversely of said table; a carriage opposing said headstock; means effecting adjustment of said carriage transversely on said table; a turret rotatable on said carriage; rotatable grinding members disposed around the rotational axis of said turret adapted for successive alignment with the surfaces of the work; indexing means for rotating said turret to selectively position said grinding members with respect to the work surfaces said indexing means being operative in synchronized relationship with respect to the shifting of the headstock to its stations; and means for effecting reciprocatory relative movement between said headstock and turret for engaging a selected grinding member with a work surface.

3. An indexing grinding machine comprising a table; a rotatable headstock reciprocal on said table; indexing devices for selectively positioning said headstock at stations transversely of said table; a rotatable turret opposing said headstock; means effecting adjustment of said turret transversely on said table; a plurality of rotatable grinding members projecting from said turret adapted to be selectively aligned with the surfaces of the work; indexing means for rotating said turret to selectively position said grinding members with respect to the work surfaces; means for effecting reciprocatory movement of said headstock for engaging a grinding member with a work surface; and means responsive to the indexing movement of the turret for operating said headstock indexing devices.

4. An indexing grinding machine comprising a table; a rotatable headstock reciprocal on said table; indexing devices for selectively positioning said headstock at stations transversely of said table; a carriage opposing said headstock; means effecting adjustment of said carriage transversely on said table; a turret rotatable on said carriage; a plurality of rotatable grinding members projecting from said turret adapted to be selectively aligned with the surfaces of the work; indexing means for rotating said turret to selectively position said grinding members with respect to the work surfaces; means for effecting reciprocatory movement of said headstock for engaging a grinding member with a work surface; and means responsive to the indexing movement of the turret for operating said headstock indexing devices.

5. An indexing grinding machine comprising a table; a rotatable headstock reciprocal on said table; means for intermittently moving said headstock transversely on said table; a rotatable turret opposing said headstock; means effecting adjustment of said turret transversely on said table; a plurality of rotatable grinding members projecting from said turret adapted to be selectively aligned with the surfaces of the work; indexing means for rotating said turret to selectively position said grinding members with respect to the work surfaces; means for effecting reciprocatory movement of said headstock toward and from the turret to engage a grinding member with a work surface; adjustable selective means for limiting movement of the headstock toward a grinding member; and means responsive to the operation of said turret indexing means for actuating said selective means.

6. An indexing grinding machine comprising a table; a rotatable headstock reciprocable on said table; means for intermittently moving said headstock transversely on said table; a carriage opposing said headstock; means effecting adjustment of said carriage transversely on said table; a turret rotatable on said carriage; a plurality of grinding members projecting from said turret adapted to be selectively aligned with the surfaces of the work; means individual to each grinding member for rotating the same; indexing means for rotating said turret to selectively position said grinding members with respect to the work surfaces; means for effecting reciprocatory movement of said headstock toward and from the turret to engage a grinding member with a work surface; selective means including adjustable stops for limiting movement of the headstock toward a respective grinding member; and means responsive to the operation of said turret indexing means for actuating said selective means.

7. An indexing grinding machine comprising a table; a rotatable headstock reciprocable longitudinally on said table; a rotatable turret opposing said headstock; rotatable grinding members projecting from said turret; stops spaced longitudinally on said table; indexing stops on said headstock; a rotatable carrier supporting said indexing stops on the headstock for movement around a common center to selectively engage the respective stops on the table thereby to limit movement of the headstock toward the turret; indexing means for rotating said turret to selectively position said grinding members with respect to the surfaces of the work; and means having operative connection with the rotatable carrier and said turret indexing means for effecting simultaneous operation thereof.

8. An indexing grinding machine comprising a table; a rotatable headstock on said table; a cross-slide supporting said headstock for transverse adjustment on said table; selective means limiting said transverse adjustment of the cross-slide; a rotatable turret opposing said headstock adjustable longitudinally and transversely on said table; rotatable grinding members on said turret adapted to be aligned with the surfaces of the work; driving means for intermittently rotating said turret; indexing means adapted to arrest rotation of said turret at predetermined locations to selectively position said grinding members with respect to the work surfaces; means for reciprocably moving said headstock bodily on the table with respect to said turret; and means common to said selective means, said driving means, and said indexing means for effecting simultaneous operation thereof.

9. An indexing grinding machine as defined in claim 8, wherein stops are provided for selectively limiting the movement of the headstock in a direction toward the turret, said stops being adjustable in a direction longitudinally of the table to effect predetermined variation in the lengths of such movement.

10. An indexing grinding machine comprising a table; a rotatable headstock on said table adapted to be shifted to predetermined stations on said table; a carriage opposing said headstock; means effecting transverse adjustment of said carriage on said table; a rotatable turret on said carriage; rotatable grinding members on said turret adapted to operate upon different surfaces of the work; and means for effecting controlled rotation of said turret, said means comprising a fixed drive member engaged with said turret for rotating the same; intermittently operable power means for actuating said drive member; and indexing devices for arresting rotation of said turret at predetermined locations, said indexing means being operative in synchronized relationship with respect to the shifting of said headstock to its stations, whereby said grinding members are selectively positioned with respect to different surfaces of the work.

11. An indexing grinding machine comprising a table; a headstock rotatable thereon; a carriage opposing said headstock; means effecting transverse adjustment of said carriage on said table; a rotatable turret on said carriage; rotatable grinding members on said turret adapted to operate on different surfaces of the work; and means for effecting controlled rotation of said turret, said means comprising a fixed drive member engaged with said turret for rotating the same; normally inactive power means for actuating said drive member; a retractable plunger on said carriage adapted for successive engagement with spaced stops on said turret thereby to limit rotation of the turret; means for retracting said plunger to release said turret for rotational movement; and means operable upon the retraction of said plunger for rendering said power means active to rotate said turret to predetermined locations thereby to selectively position said grinding members with respect to different surfaces of the work.

12. An indexing grinding machine comprising a table; a headstock rotatable thereon; a carriage opposing said headstock; means effecting transverse adjustment of said carriage on said table; a rotatable turret on said carriage; rotatable grinding members on said turret adapted to operate upon different surfaces of the work; and means for effecting controlled rotation of said turret comprising a fixed drive member engaged with said turret for rotating the same; normally inactive power means for actuating said drive member; a retractable plunger on said carriage adapted for successive engagement with spaced stop means on said turret thereby to limit rotation of the turret; a manually operated lever fulcrumed on said carriage for retracting said plunger to release the turret for rotational movement; and means responsive to the operation of said lever for rendering said power means active to operate said drive member and rotate said turret predetermined distances thereby to selectively position said grinding members with respect to different surfaces of the work.

13. An indexing grinding machine comprising a table; a headstock rotatable thereon; a carriage on said table opposing said headstock; a rotatable turret on said carriage; rotatable grinding members on said turret adapted to operate upon different surfaces of the work; and means for effecting controlled rotation of said turret, comprising a gear on said turret; a pinion on said carriage meshed with said gear; a reciprocable rack for rotating said pinion; an overriding clutch device interposed between said pinion and rack for effecting rotation of said pinion during reciprocatory movement of the rack in one direction; a pressure fluid circuit having a reciprocable member therein operatively connected to said rack; indexing devices for predetermining the extent of rotation of said turret to position said grinding members with respect to the surfaces to be worked on; means for releasing said indexing devices to permit rotation of said turret; and a normally closed valve in said pressure fluid circuit, said valve being responsive to the operation of said releasing means to open said pressure fluid circuit for actuating the reciprocal member therein.

14. An indexing grinding machine comprising a table; a headstock rotatable thereon; a carriage on said table opposing said headstock; a rotatable turret on said carriage; rotatable grinding members on said turret adapted to operate upon different surfaces of the work; and means for effecting controlled rotation of said turret, comprising a gear on said turret; a pinion on said carriage meshed with said gear; a reciprocable rack; an overriding clutch device operatively connecting said rack and pinion, said rack thereby adapted in one direction of movement to rotate said pinion and in its other direction of movement to be ineffective thereon; a pressure fluid circuit; a cylinder interposed in said circuit; a piston reciprocal in said cylinder, said piston actuated by the pressure fluid in said circuit and operatively connected to said rack; indexing devices for predetermining the extent of rotation of said turret thereby to selectively position said grinding members with respect to the surfaces of the work; means for releasing said indexing devices to permit rotation of said turret; and a control valve in said pressure fluid circuit that is responsive to the operation of said releasing means, said valve in opened position releasing the pressure fluid to operate said piston and said valve in closed position rendering the pressure fluid inactive.

15. In a grinding machine comprising a table; a carriage thereon; a rotatable turret on said carriage; rotatable grinding members on said turret adapted to operate upon different surfaces of the work; and means for indexing said turret to selectively position said grinding members with respect to the work surfaces, said means comprising a gear on said turret; a drive pinion on said carriage meshed with said gear; a reciprocable rack adapted in one direction of movement to rotate said pinion; hydraulically operated means for imparting reciprocatory movement to said rack; indexing devices for predetermining the extent of rotation of said turret; means for releasing said indexing devices to permit rotation of said turret; and means responsive to the operation of said releasing means for rendering said hydraulic means active during the indexing of the turret and inactive during the operation of the grinding members.

16. An indexing grinding machine comprising a table; a headstock rotatable supporting a work piece on said table; indexing devices for selectively positioning said headstock at stations transversely of said table; a plurality of rotatable grinding members adapted for bodily movement around a common center; means for supporting said grinding members on said table; means for effecting reciprocatory relative movement between said headstock and said supporting means for engaging a grinding member with a surface of the work piece; and indexing means for selectively aligning said grinding members with different surfaces of the work piece, said indexing means operating in synchronized relation with respect to said headstock indexing devices.

17. An indexing grinding machine comprising a table; a headstock rotatably supporting a work piece on said table; indexing devices for selectively positioning said headstock at stations transversely of said table; a plurality of rotatable grinding members adapted for bodily movement around a common center; driving means individual to said grinding members for rotating the same; means for supporting said grinding members and said driving means on said table; means for effecting reciprocatory relative movement between said headstock and said supporting means for engaging a grinding member with a surface on the work piece; and indexing means for selectively aligning said grinding members with different surfaces on the work piece, said indexing means operating in synchronized relation with respect to said headstock indexing devices.

AUGUSTUS B. BOLENDER.

REFERENCES CITED

The following references are of record in the file of this patent:

UNITED STATES PATENTS

| Number | Name | Date |
| --- | --- | --- |
| 925,867 | Bryant | June 22, 1909 |
| 627,385 | Brockie | June 20, 1899 |
| 2,184,475 | Schaerer | Dec. 26, 1939 |

FOREIGN PATENTS

| Number | Country | Date |
| --- | --- | --- |
| 8,091 | Great Britain | Mar. 31, 1911 |
| 22,457 | Great Britain | Oct. 2, 1912 |

Certificate of Correction

Patent No. 2,423,367.                                                                July 1, 1947.

AUGUSTUS B. BOLENDER

It is hereby certified that errors appear in the printed specification of the above numbered patent requiring correction as follows: Column 2, line 20, for "remote of" read *remote to*; column 6, line 51, for "indler" read *idler*; column 11, line 38, for "rotatable" read *rotatably*; and that the said Letters Patent should be read with these corrections therein that the same may conform to the record of the case in the Patent Office.

Signed and sealed this 30th day of September, A. D. 1947.

[SEAL]

THOMAS F. MURPHY,
*Assistant Commissioner of Patents.*